(12) United States Patent
Hirama

(10) Patent No.: US 12,487,508 B2
(45) Date of Patent: Dec. 2, 2025

(54) IMAGE CAPTURING APPARATUS, ASSISTING METHOD FOR FOCUS CONTROL, AND STORAGE MEDIUM

(71) Applicant: CANON KABUSHIKI KAISHA, Tokyo (JP)

(72) Inventor: Tomohiro Hirama, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 223 days.

(21) Appl. No.: 18/358,138

(22) Filed: Jul. 25, 2023

(65) Prior Publication Data

US 2024/0036438 A1    Feb. 1, 2024

(30) Foreign Application Priority Data

Jul. 29, 2022    (JP) .................. 2022-122017

(51) Int. Cl.
| | |
|---|---|
| G03B 17/12 | (2021.01) |
| G03B 13/34 | (2021.01) |
| H04N 23/12 | (2023.01) |
| H04N 23/60 | (2023.01) |
| H04N 23/63 | (2023.01) |
| H04N 23/80 | (2023.01) |

(52) U.S. Cl.
CPC ............ G03B 17/12 (2013.01); G03B 13/34 (2013.01); H04N 23/12 (2023.01); H04N 23/633 (2023.01); H04N 23/64 (2023.01); H04N 23/665 (2023.01); H04N 23/80 (2023.01)

(58) Field of Classification Search
CPC ........ G03B 17/12; G03B 13/34; G03B 17/14; H04N 23/12; H04N 23/633; H04N 23/64; H04N 23/665; H04N 23/80; H04N 23/663; H04N 23/667; H04N 23/67
See application file for complete search history.

(56) References Cited

U.S. PATENT DOCUMENTS

| | | | |
|---|---|---|---|
| 2015/0042867 A1* | 2/2015 | Shiono ............... | G02B 7/38 |
| | | | 348/348 |
| 2017/0099428 A1* | 4/2017 | Okuyama ............ | H04N 25/704 |
| 2021/0400180 A1* | 12/2021 | Omata ................ | H04N 23/67 |
| 2023/0341753 A1* | 10/2023 | Suzuki ............... | H04N 23/687 |

FOREIGN PATENT DOCUMENTS

JP    11-014892 A    1/1999

* cited by examiner

*Primary Examiner* — Gevell V Selby
(74) *Attorney, Agent, or Firm* — Cowan, Liebowitz & Latman, P.C.

(57) ABSTRACT

An image capturing apparatus comprises: an operation member used to move a position of focus lens included in an attached optical system; a recording unit that records the position of the focus lens as an index value in a memory in association with information of the attached optical system including the focus lens in response to a registration instruction; an acquisition unit that acquires information for identifying the attached optical system; a readout unit that, if there is an index value recorded in association with the information of the attached optical system corresponding to the information acquired by the acquisition unit, reads out the index value from the memory; and a control unit that controls a display device to display the read index value and a current position of the focus lens.

19 Claims, 14 Drawing Sheets

IMAGE CAPTURING APPARATUS, ASSISTING METHOD FOR FOCUS CONTROL, AND STORAGE MEDIUM

BACKGROUND OF THE INVENTION

Field of the Invention

The present invention relates to an image capturing apparatus, an assisting method for focus control, and a storage medium, and more particularly to a function of assisting a focus control operation in manual focus control.

Description of the Related Art

Conventionally, in the production of a video work, there is a case where manual focus operation to focus on a subject is performed to shoot the subject. At that time, there is a function called focus position guide that supports manual focus operation by registering a plurality of desired focus lens positions in advance and displaying the registered focus lens positions and the current focus lens position together with an image obtained during shooting preparation period or with an image being shot.

On the other hand, Japanese Patent Laid-Open No. 11-14892 discloses that when a lens barrel is detached from a camera body and the power supply to the lens barrel from the camera body is terminated, a registered preset position of the focal position is stored in a non-volatile memory of the lens barrel so that the registered preset position of the focal position can be referred to again. It is also disclosed that when the lens barrel is attached to the camera body, the preset position data is read out from the non-volatile memory and the focal position of the lens barrel is automatically moved to the preset position.

However, there are cases where it is desired to maintain the registration of a plurality of registered focus lens positions, and there are cases where it is desired to cancel the registration, depending on the shooting situation. In the conventional example described above, for example, when the camera is turned off, the lens is replaced, and the power is turned on again, there is a problem in that the focus lens position of the lens before the replacement is referred to, resulting in displaying a focus position guide at a position that does not follow the user's intention.

Further, in Japanese Patent Laid-Open No. 11-14892, the stored preset position data is used to automatically move the focal position of the lens barrel to the preset position, and there is no description about using the preset position data in manual focus operation.

SUMMARY OF THE INVENTION

The present invention has been made in consideration of the above situation, and shortens shooting preparation in a case of performing focus control by manual operation.

According to the present invention, provided is an image capturing apparatus comprising: an operation member used to move a position of focus lens included in an attached optical system; a recording unit that records the position of the focus lens as an index value in a memory in association with information of the attached optical system including the focus lens in response to a registration instruction; an acquisition unit that acquires information for identifying the attached optical system; a readout unit that, if there is an index value recorded in association with the information of the attached optical system corresponding to the information acquired by the acquisition unit, reads out the index value from the memory; and a control unit that controls a display device to display the read index value and a current position of the focus lens, wherein the recording unit, the acquisition unit, the readout unit, and the control unit are implemented by one or more processors and/or circuitry.

Further, according to the present invention, provided is an assisting method for focus control comprising: repeatedly obtains a position of focus lens included in an attached optical system; recording the position of the focus lens as an index value in a memory in association with information of the attached optical system including the focus lens in response to a registration instruction; acquiring information for identifying the attached optical system; if there is an index value recorded in association with the information of the attached optical system corresponding to the acquired information reading out the index value from the memory; and controlling a display device to display the read index value and a current position of the focus lens.

Furthermore, according to the present invention, provided is a non-transitory computer-readable storage medium, the storage medium storing a program that is executable by the computer, wherein the program includes program code for causing the computer to function as an image capturing apparatus having an operation member used to move a position of focus lens included in an attached optical system, comprising: a recording unit that records the position of the focus lens as an index value in a memory in association with information of the attached optical system including the focus lens in response to a registration instruction; an acquisition unit that acquires information for identifying the attached optical system; a readout unit that, if there is an index value recorded in association with the information of the attached optical system corresponding to the information acquired by the acquisition unit, reads out the index value from the memory; and a control unit that controls a display device to display the read index value and a current position of the focus lens.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

DESCRIPTION OF THE EMBODIMENTS

Figure 1:
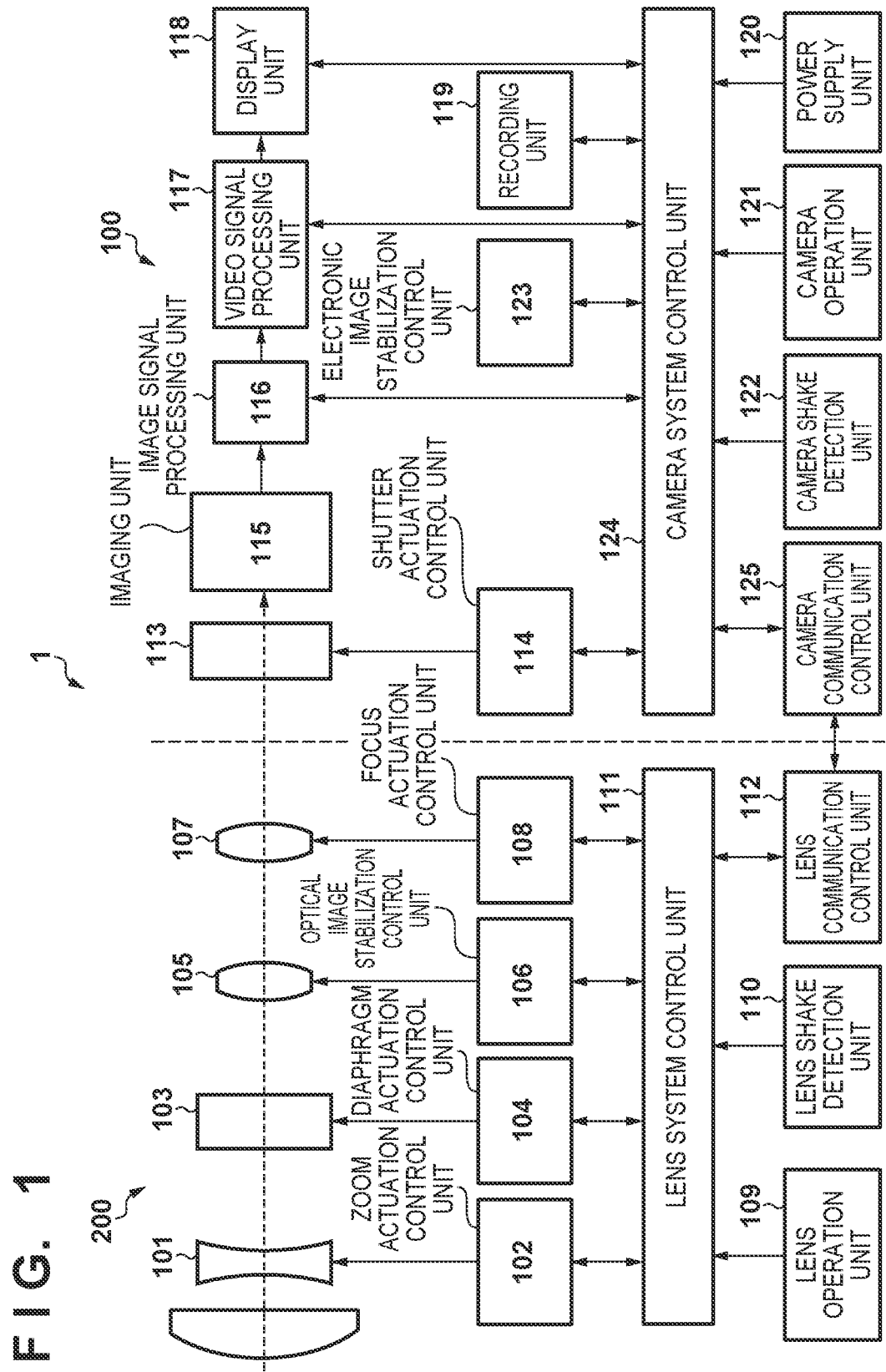
FIG. 1 is a block diagram illustrating a configuration example of an image capturing apparatus according to an embodiment of the present invention.

Hereinafter, embodiments will be described in detail with reference to the attached drawings. Note, the following embodiments are not intended to limit the scope of the claimed invention, and limitation is not made to an invention that requires a combination of all features described in the embodiments. Two or more of the multiple features described in the embodiments may be combined as appropriate. Furthermore, the same reference numerals are given to the same or similar configurations, and redundant description thereof is omitted.

First Embodiment

Configuration of Image Capturing Apparatus

FIG. 1 is a block diagram schematically showing a configuration example of a lens-interchangeable digital camera for capturing still images and moving images, as an example of an image capturing apparatus according to an embodiment of the present invention. Note that the scope of application of the present invention is not limited to digital cameras, and the present invention can be applied to various image capturing apparatuses.

An image capturing apparatus 1 is mainly composed of a detachable lens unit 200 and a camera body 100, and the lens unit 200 is attached to the camera body 100 for use.

In the lens unit 200, a zoom unit 101 includes a zoom lens used for zooming, and a zoom actuation control unit 102 controls and actuates the zoom unit 101. A diaphragm unit 103 has a diaphragm function, and a diaphragm actuation control unit 104 controls and actuates the diaphragm unit 103. An image stabilization unit 105 includes an image stabilization lens such as a shift lens, and the image stabilization unit 105 is controlled and actuated by an optical image stabilization control unit 106. A focus unit 107 includes a focus lens that changes a focus position, and a focus actuation control unit 108 controls and actuates the focus unit 107.

A lens operation unit 109 includes operation members such as rings for operating the zoom, aperture, and focus (optical system) of the lens described above, and is used by the user to operate the lens unit 200. A lens shake detection unit 110 detects an amount of shake applied to the lens unit 200 and outputs a detection signal to a lens system control unit 111.

A lens system control unit 111 has a Central Processing Unit (CPU), controls the entire lens unit 200, and performs overall control of actuation control units and correction control units. The lens system control unit 111 can communicate with a control unit of the camera body 100 via a lens communication control unit 112.

Next, the camera body 100 will be explained. In the camera body 100, a shutter unit 113 controls the incidence of light passing through the lens unit 200 into the camera body 100. A shutter actuation control unit 114 controls and actuates the shutter unit 113. An imaging unit 115 includes an image sensor such as a CCD or CMOS sensor, photo-electrically converts light passing through the shutter unit 113, and outputs an electric signal. Note that the image sensor in this embodiment can receive light that has passed through different exit pupil regions of the lens unit 200 separately, and output electrical signals so that electrical signals corresponding to the amounts of received light can be obtained. Then, based on the obtained electrical signals, so-called on-imaging plane phase difference focus detection can be performed. It is also possible to add and output electrical signals corresponding to light that has passed through the different exit pupil regions.

An image signal processing unit 116 converts the electrical signals output from the imaging unit 115 into focus detection signals and/or an image signal. Then, the image signal processing unit 116 outputs the focus detection signals to a camera system control unit 124 and the image signal to a video signal processing unit 117. The video signal processing unit 117 processes the image signal output from the image signal processing unit 116 according to the application of the image signal. For example, image stabilization can be performed by changing the clipping area of the image signal according to a correction amount from an electronic image stabilization control unit 123.

A display unit 118 displays an image based on the video signal output from the video signal processing unit 117, and displays information on various control performed by the lens system control unit 111 as needed. A recording unit 119 stores various data including video information output from the video signal processing unit 117.

A power supply unit 120 supplies power to the entire image capturing apparatus 1 according to the purpose of operation.

A camera operation unit 121 is used by the user to operate the image capturing apparatus 1, and includes a shutter release button for instructing shooting of a still image, a moving image recording switch for instructing recording of a moving image, and a selection switch for selecting a playback mode. Further, it includes a button for selecting enable/disable of the focus position guide, which will be described later, and a focus position guide index value registration decision button, which will be described later. These buttons and switches may be configured by hardware keys, software keys, or in combinations. Also, the camera operation unit 121 may have a shift button or the like for operating the focus lens or the zoom lens. Then, it outputs a signal corresponding to the operation to the camera system control unit 124.

The shutter release button is configured such that a first switch (SW1) and a second switch (SW2) are turned on in order according to the amount of depression. The first switch SW1 is turned on when the user presses the shutter release button halfway, and the second switch SW2 is turned on when the user presses the shutter release button all the way. When the first switch SW1 is turned on, the focus actuation control unit 108 actuates the focus unit 107 to adjust the focus, and the diaphragm actuation control unit 104 actuates the diaphragm unit 103 to set an appropriate exposure amount. When the second switch is turned on, image data obtained from the optical image formed on the imaging unit 115 is stored in the recording unit 119.

Further, when the user presses the moving image recording switch, the recording of the moving image is started, and when the user presses the moving image recording switch again during recording of the moving image, the recording of the moving image ends. Alternatively, different switches for instructing the start and end of moving image recording may be provided.

The camera shake detection unit 122 detects an amount of shake applied to the camera and outputs a signal indicating the detected amount of shake to the camera system control unit 124.

The camera system control unit 124 has a CPU and performs overall control of the entire image capturing apparatus 1. The camera system control unit 124 and the lens system control unit 111 communicate with each other via a camera communication control unit 125 and the lens communication control unit 112. Thus, when the lens unit 200 is attached to the camera body 100 and electrically connected, mutual communication is performed via the lens communication control unit 112 and the camera communication control unit 125.

Focus Control

Figure 2:
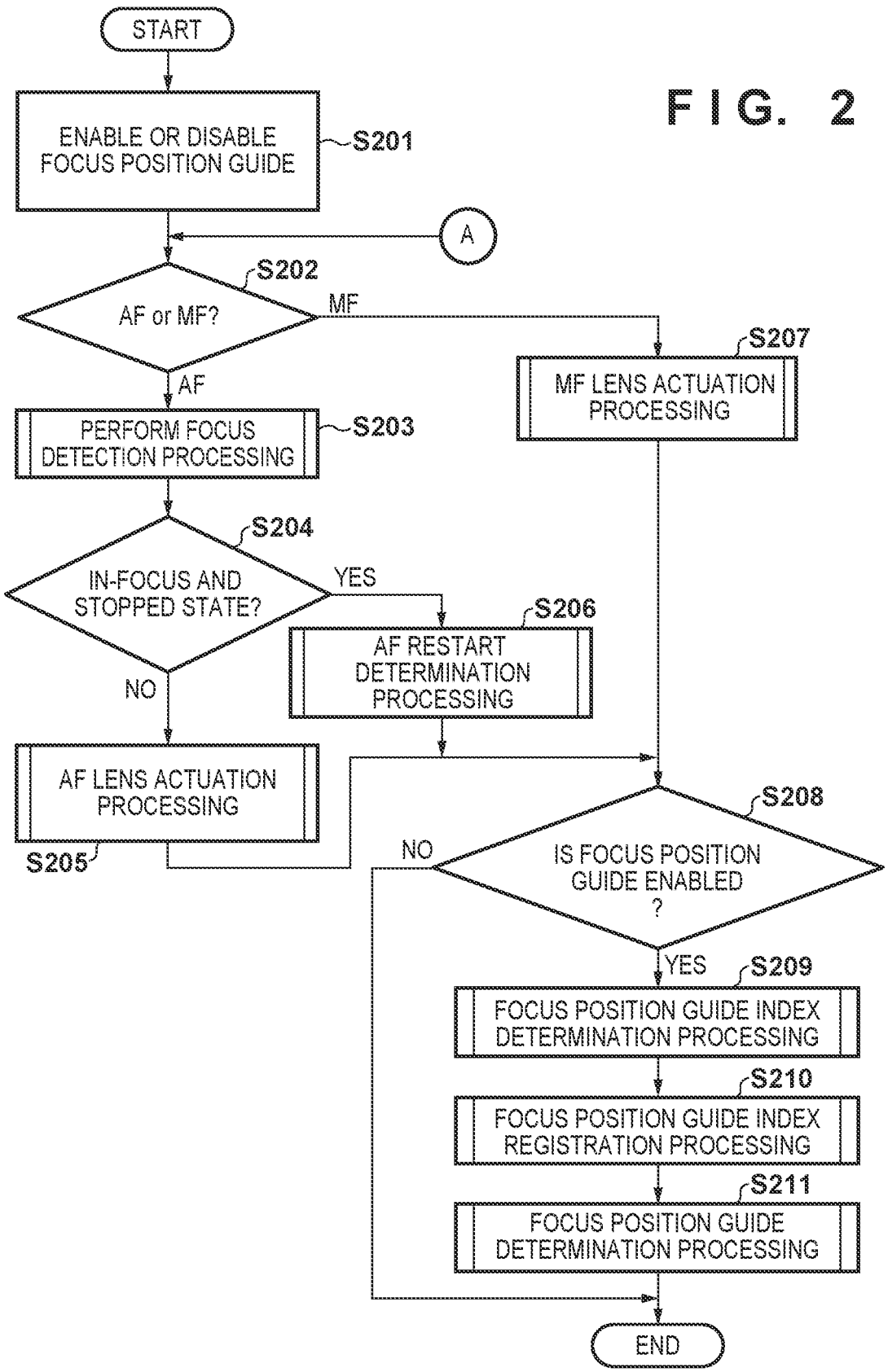
FIG. 2 is a flowchart illustrating focus control according to the embodiment.

Next, focus control during shooting a moving image performed by the camera system control unit 124 of the image capturing apparatus 1 having the above configuration will be described with reference to the flowchart of FIG. 2. Note that the focus control shown in FIG. 2 is repeatedly executed, for example, while the image capturing apparatus 1 is in a mode capable of shooting moving images.

First, in step S201, focus position guide is enabled or disabled.

Here, the focus position guide will be explained. Normally, to focus manually, a series of processes from steps S601 to S604 in FIG. 6, which will be described later, has to be performed by the user repeatedly performing the work of visually determining the focus in order to move the focus lens to an in-focus position. The same operation is required in a case of focusing on a subject, then focusing on another subject, and then focusing on the original subject again.

The focus position guide is a function that assists manual focus operations in order to reduce the user's burden and time loss that occur in such cases. In the focus position guide function, first, a desired subject is focused in advance, and the position of the focus lens at that time is registered as a focus position guide index value for the focus position guide function. Then, the registered focus position guide index value and the current position of the focus lens are displayed together with the image being captured.

With this function, in a case of changing the focus state so as to focus on another subject, for example, and refocusing on the original subject by manual operation, the user can move the current focus lens position toward the registered focus position guide index value while comparing the registered focus position guide index value and the current focus lens position displayed on the screen. In this way, the user can visually grasp the current focus lens position and an amount of manual operation to move the focus lens to the position of the registered focus position guide index value, which facilitates refocusing. In this embodiment, the user can select whether to enable or disable the focus position guide using the camera operation unit 121 in FIG. 1.

In step S202, it is determined whether automatic focus control (AF) or manual focus control (MF) is set. If AF is set, the process proceeds to step S203, and if MF is set, the process proceeds to step S207. If AF is set, AF control processing is performed from step S203 onwards, and if MF is set, MF control processing is performed from step S207 onwards.

In step S203, focus detection processing is performed. Here, defocus information and reliability information for performing the on-imaging plane phase difference AF are acquired. Details of the focus detection processing in step S203 will be described later with reference to FIG. 3.

In step S204, the camera system control unit 124 determines whether or not the current focus state is an in-focus state and the focus lens is not moved (referred to as "in-focus and stopped state"). If not in the in-focus and stopped state, the process proceeds to step S205, and if in the in-focus and stopped state, the process proceeds to step S206. Whether or not the current state is the in-focus and stopped state is determined by the in-focus and stopped state flag which is turned on/off by the processes of step S205 and step S206, which will be described later. Note that the focus stop flag is set to OFF as an initial value.

In step S205, AF lens actuation processing is performed based on the information detected in step S203, and the process proceeds to step S208. Details of the AF lens actuation processing in step S205 will be described later with reference to FIG. 4.

In step S206, AF restart determination processing for determining whether or not to restart AF control is performed in a case where, for example, the subject moves or changes during in the focused and stopped state, and the process proceeds to step S208. Details of the AF restart determination processing in step S206 will be described later with reference to FIG. 5.

On the other hand, if it is determined in step S202 that MF is set, MF lens actuation processing is performed in step S207. Details of the MF lens actuation processing in step S207 will be described later with reference to FIG. 6.

After the MF lens actuation processing, in step S208, it is determined whether or not the focus position guide was enabled in step S201 of FIG. 2. If it was enabled, the process proceeds to step S209, and if it was disabled, the processing ends because the focus position guide is not used.

In step S209, focus position guide index determination, which is a focus assist function, is performed, and a change-focus flag is set. Details of the processing in step S209 will be described later with reference to FIG. 7.

In step S210, a position to be an index for the focus position guide is set based on the change-focus flag set in step S209. Details of the processing in step S210 will be described later with reference to FIG. 8.

In step S211, focus position guide determination processing is performed based on the focus position guide index set in step S210 and the position information of the focus lens acquired in step S404 or step S604. Details of the processing in step S211 will be described later with reference to FIG. 9.

The focus control performed by the camera system control unit 124 has been described above.

Next, the focus detection processing performed in step S203 in a case where AF is set will be described with reference to the flowchart of FIG. 3. In the present embodiment, it is assumed that known phase difference focus detection is performed, and a brief description thereof will be given below.

First, in step S301, a pair of image signals (focus detection signals) corresponding to a focus detection area arbitrarily set in an image are obtained. Next, in step S302, while relatively shifting the pair of image signals acquired in step S301, a correlation amount between the pair of image signals at each shift position is obtained. Subsequently, in step S303, a correlation change amount of the correlation amount obtained at each shift position obtained in step S302 is obtained. Then, in step S304, an image shift amount is obtained from the correlation change amount calculated in step S303.

Next, in step S305, the reliability representing how the image shift amount calculated in step S304 is reliable is obtained. These processes are performed as many times as the number of focus detection areas existing in the image. Then, in step S306, the image shift amount is multiplied by a conversion coefficient and converted into a defocus amount for each focus detection area. Finally, in step S307, the focus detection area to be used for AF is determined, and the process returns to FIG. 2. In the processes of steps S205 and S206, which will be described later, the defocus amount of the focus detection area determined in step S307 is used.

Figure 4:
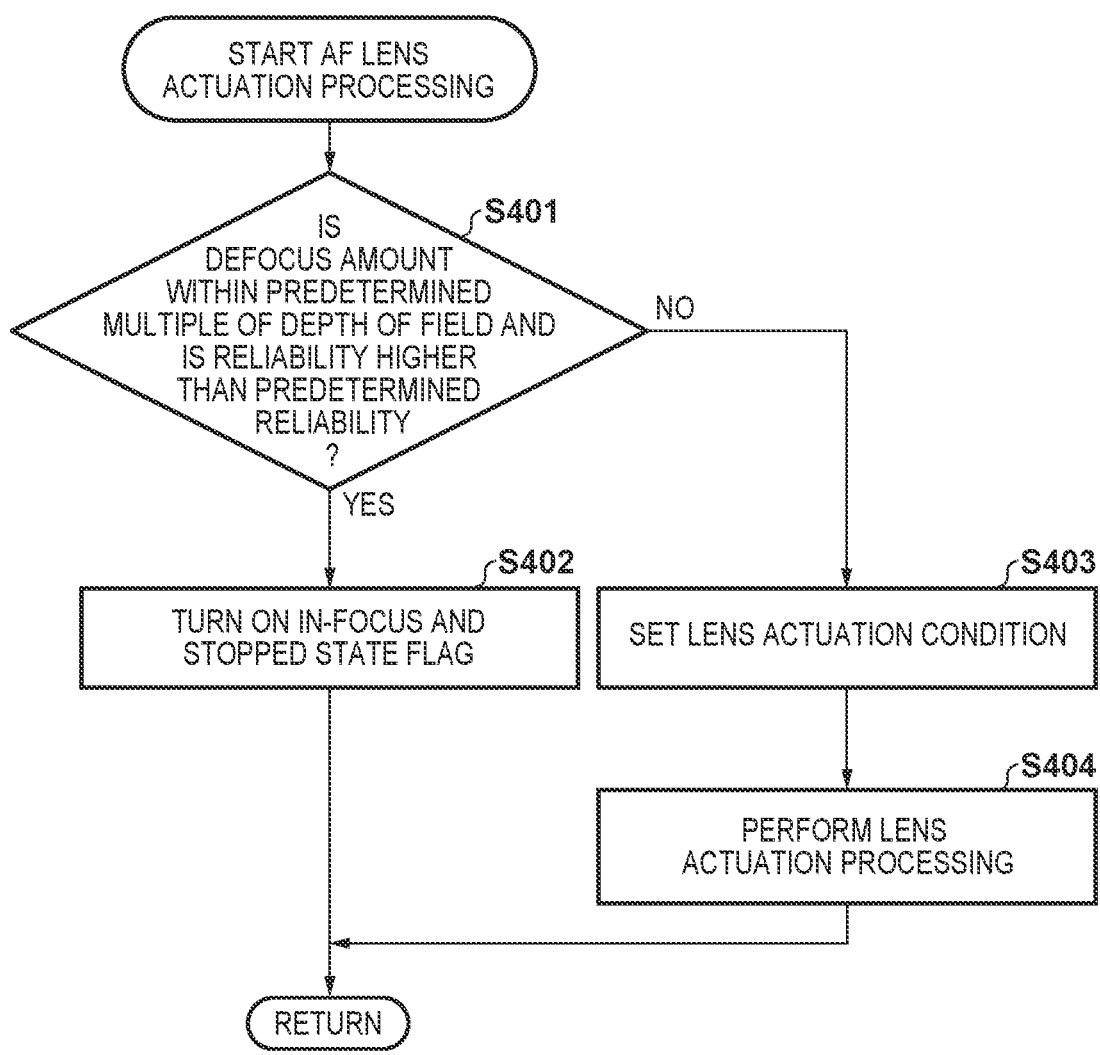
FIG. 4 is a flowchart illustrating AF lens actuation processing according to the embodiment.

Next, the AF lens actuation processing performed in step S205 of FIG. 2 will be described with reference to the flowchart of FIG. 4. The AF lens actuation processing is processing for actuating the focus lens when not in the in-focus and stopped state and for determining whether or not to shift to the in-focus and stopped state.

Figure 3:
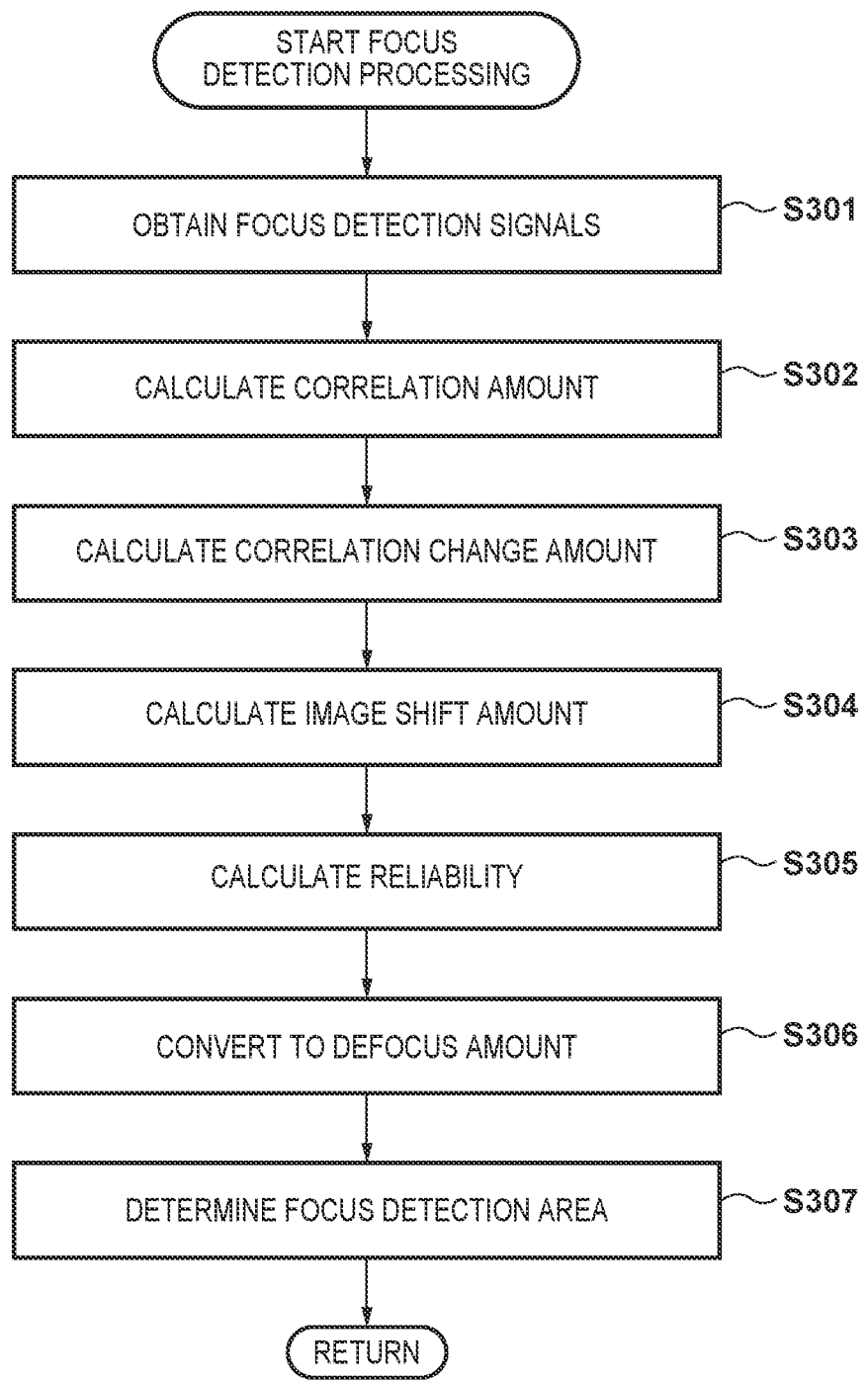
FIG. 3 is a flowchart illustrating focus detection processing according to the embodiment.

In step S401, it is determined whether or not the defocus amount is within a predetermined multiple of the depth of field in the currently set aperture value and lens state, and whether or not the reliability calculated in step S305 of FIG. 3 is higher than a predetermined reliability. If these conditions are met, the process proceeds to step S402; otherwise, the process proceeds to step S403. In this embodiment, in step S401, the defocus amount is compared with the depth of field (i.e., ×1), however, the value to be compared to may be set larger or smaller as needed.

At step S402, the in-focus and stopped state flag is turned on, and the process returns to FIG. 2. In this way, if it is determined that the subject is in focus, after the focus lens is shifted from the actuated state to the stopped state, restart determination is performed in step S206 of FIG. 2.

On the other hand, in step S403, the lens actuation speed and actuation method are set, and the process proceeds to step S404. In step S404, the camera system control unit 124 performs lens actuation processing for the focus lens based on the defocus amount, and the process returns to FIG. 2.

Figure 5:
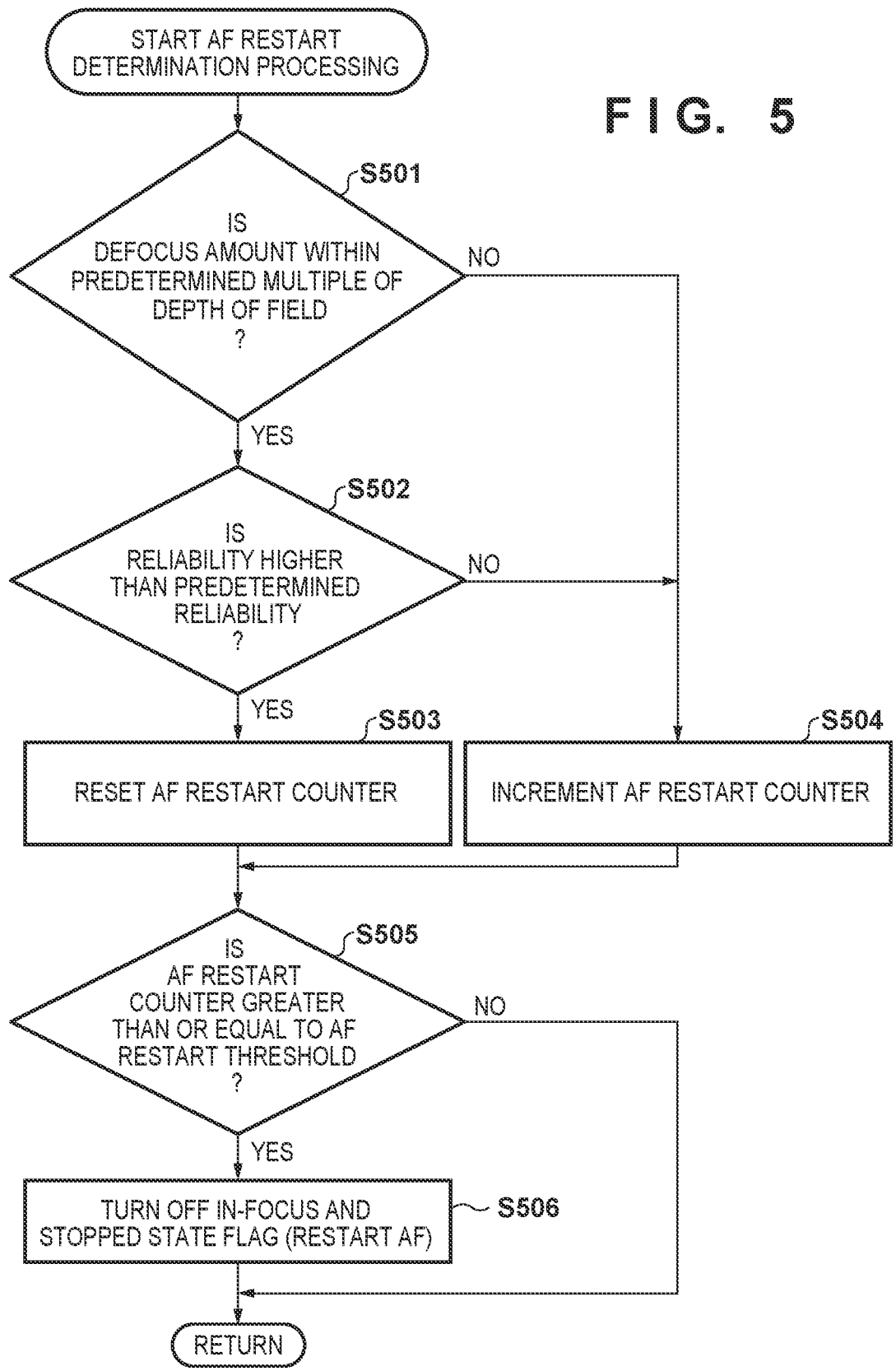
FIG. 5 is a flowchart illustrating AF restart determination processing according to the embodiment.

Next, the AF restart determination processing performed in step S206 of FIG. 2 will be explained with reference to the flowchart of FIG. 5. The AF restart determination processing is processing for determining whether or not to restart actuation of the focus lens in the state in which in-focus is determined and the focus lens is stopped.

First, in step S501, it is determined whether or not the calculated defocus amount is within a predetermined multiple of the depth of field. If it is within the predetermined multiple of the depth of field, the process proceed to step S502, and if not, the process proceeds to step S504.

In step S502, it is determined whether or not the reliability calculated in step S305 of FIG. 3 is higher than a predetermined reliability. If the reliability is higher than the predetermined reliability, the process proceeds to step S503, and if the reliability is equal to or less than the predetermined reliability, the process proceeds to step S504. In S503, an AF restart counter is reset, and the process proceeds to step S505. On the other hand, in step S504, the AF restart counter is incremented by 1, and the process proceeds to step S505.

In this way, in a case where the defocus amount exceeds the predetermined multiple of the depth of field, or in a case where the reliability is equal to or lower than the predetermined reliability, the AF restart counter is incremented in step S504 to prepare for restarting the AF, since there is a possibility that the main subject being shot has changed. On the other hand, in a case where the detected defocus amount is within the predetermined multiple of the depth of field and the reliability is maintained higher than the predetermined reliability, the AF restart counter is reset in step S503 so that the focus lens is continuously stopped.

Further, the defocus amount determination criterion (the predetermined multiple of the depth of field) set in step S501 may be adjusted such that in a case where the main subject changes, restart is easily determined, and in a case where the main subject does not change, restart is not easily determined. As an example, 1x the depth of field is set until the main subject appears blurred. Also, as for the threshold for the reliability set in step S502, for example, a value at which the reliability is so low that it is difficult to trust the defocus direction may be set as a value at which the main subject is considered to be changed. Thus, the thresholds set in steps S501 and S502 are determined according to the degree of criteria for determining that the main subject is changed.

Next, in step S505, it is determined whether or not the AF restart counter is greater than or equal to a predetermined AF restart threshold. If it is greater than or equal to the AF restart threshold, the process proceeds to step S506, and if it is less than the AF restart threshold, the processing ends. In step S506, by turning off the in-focus and stopped state flag, the AF lens actuation processing shown in FIG. 4 is resumed, and the process returns to FIG. 2.

Figure 6:
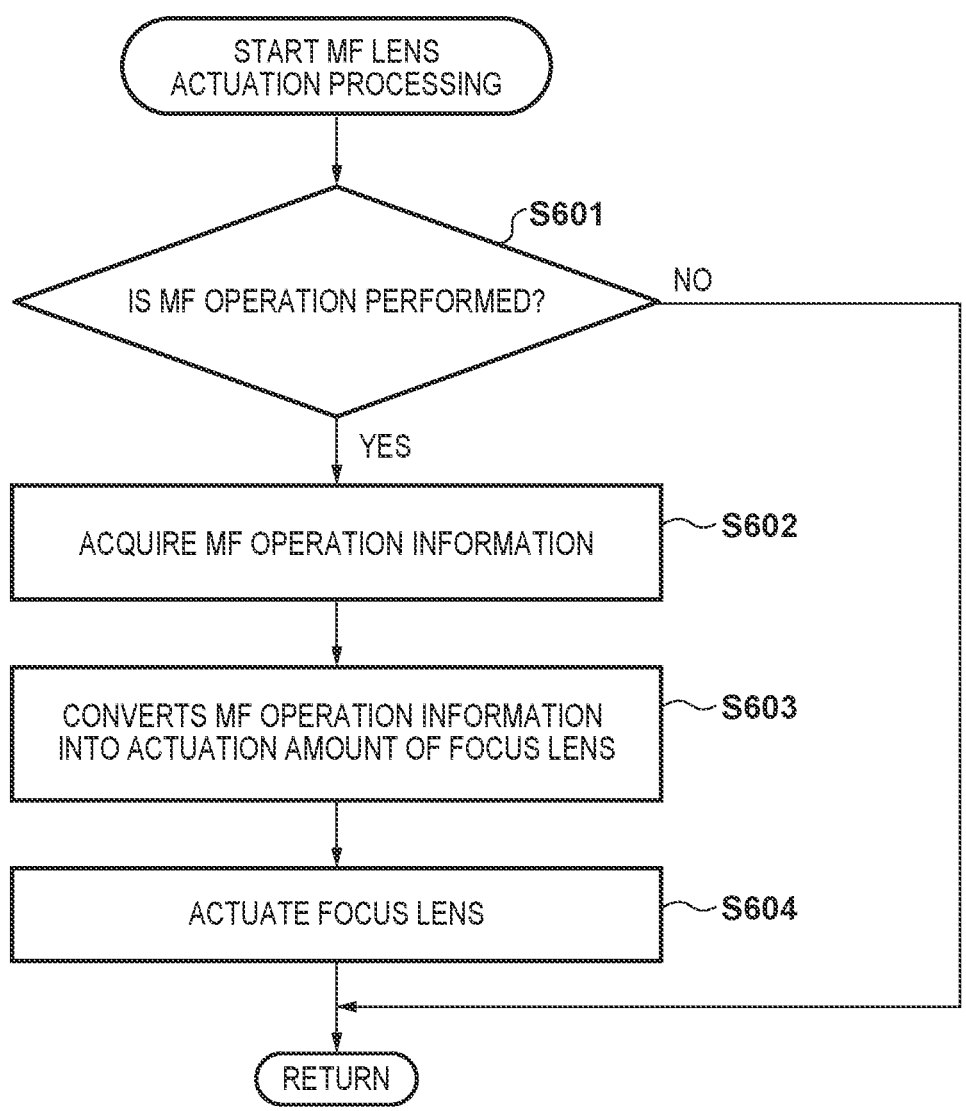
FIG. 6 is a flowchart for explaining MF lens actuation processing according to the embodiment.

Next, the MF lens actuation processing in step S207 of FIG. 2 will be described with reference to the flowchart in FIG. 6.

In step S601, it is determined whether or not there is an MF operation. If there is an MF operation, the process proceeds to step S602; otherwise, the MF lens actuation processing is terminated.

In step S602, MF operation information is acquired. Here, the lens system control unit 111 receives the operation information of the lens operation unit 109, detects the moving direction and moving amount (MF operation information) of the lens operation unit 109, and sends the MF operation information to the camera system control unit 124 via the lens communication control unit 112 and camera communication control unit 125.

In step S603, the camera system control unit 124 converts the detected MF operation information into the actuation amount of the focus lens. Then, in step S604, the actuation amount of the focus lens is transmitted from the camera system control unit 124 to the lens system control unit 111 via the camera communication control unit 125 and the lens communication control unit 112. The lens system control unit 111 sends a focus lens actuation command to the focus actuation control unit 108 based on the received actuation amount, and eventually the focus lens is actuated.

Figure 7:
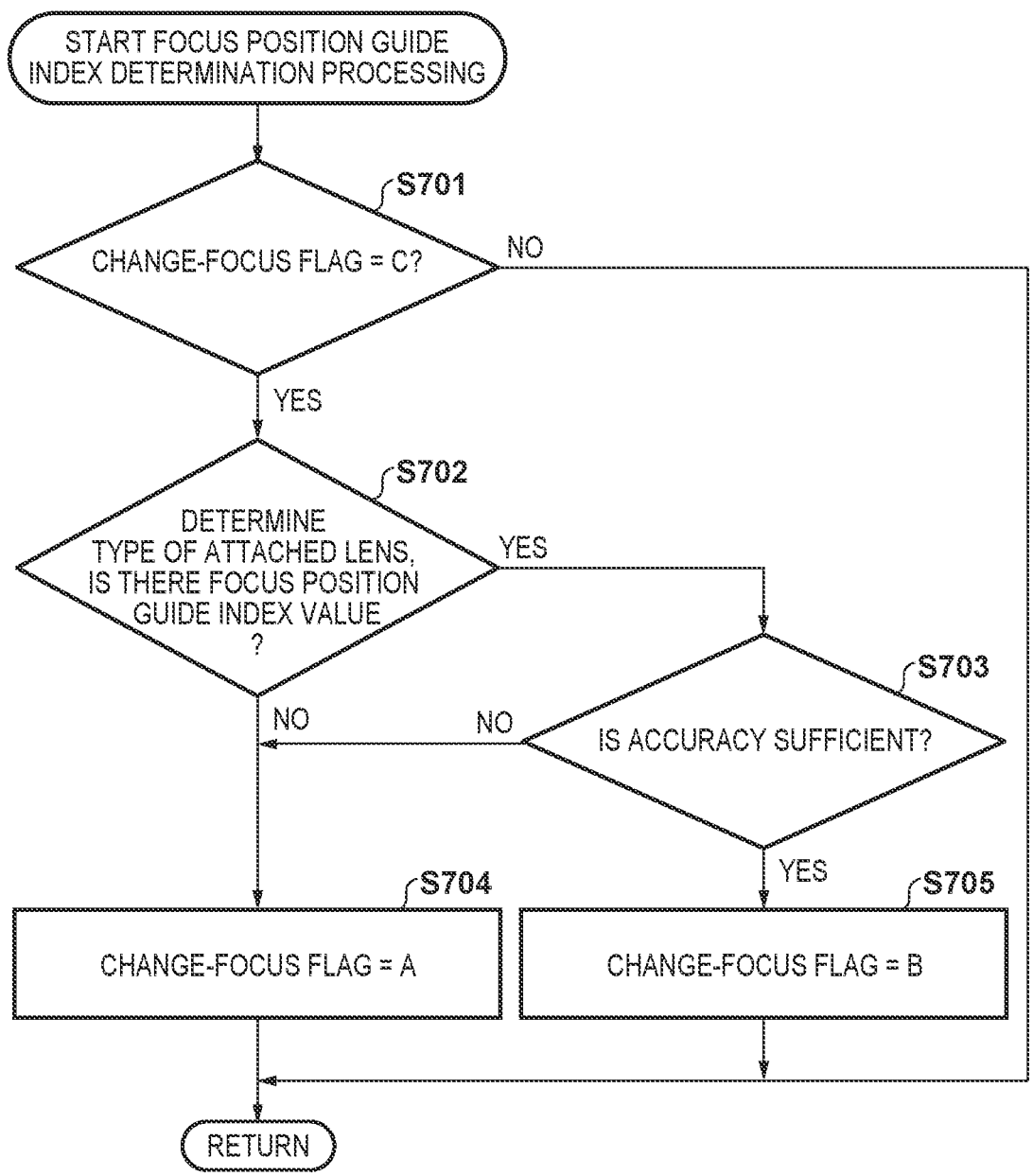
FIG. 7 is a flowchart illustrating focus position guide index determination processing according to a first embodiment.

Next, the focus position guide index determination processing in step S209 of FIG. 2 will be described with reference to FIG. 7.

In step S701, it is determined whether or not the change-focus flag is set to C. If it is determined to be C, the process advances to step S702, and if it is determined to be not C, the processing ends.

In step S702, the type of the attached lens is determined. In this embodiment, the ID information assigned to each lens is referred to, and it is determined whether or not any setting associated with the ID set at the time of using the focus position guide function in the past remains. If the focus position guide index value associated with the lens ID used in the past remains, the process proceeds to step S703, and if no focus position guide index value associated with the lens ID used in the past remains, the process proceeds to step S704.

In step S703, it is determined whether or not the accuracy of the focus position guide index value used in the past associated with the lens ID referred to in step S702 is sufficient under the current shooting settings, and whether or not the accuracy of the current focus position guide index value is sufficient when the shooting settings are changed. Shooting settings include settings that may cause shortage of required focus accuracy in a case where the shooting area, angle of view, resolution, optical path length and focal length of the lens, etc. are changed optically, electronically, or other means, and settings that may cause shortage of required focus accuracy in a case where image correction such as distortion correction, peripheral light amount correction, resolution enhancement, and image stabilization, etc. is performed. As an example, after setting the focus position guide index value at a wide angle of view, if the angle of view is changed to a telephoto angle of view due to image cropping, etc., the focus error that was not noticeable at the wide angle will become noticeable. In this case, it is determined that the focus accuracy is insufficient. If the accuracy of the focus position guide index value is determined to be insufficient, the process proceeds to step S704, and if the accuracy is determined to be sufficient, the process proceeds to step S705.

In step S704, the change-focus flag is set to A, and in step S705, the change-focus flag is set to B, and the processing ends.

Figure 8:
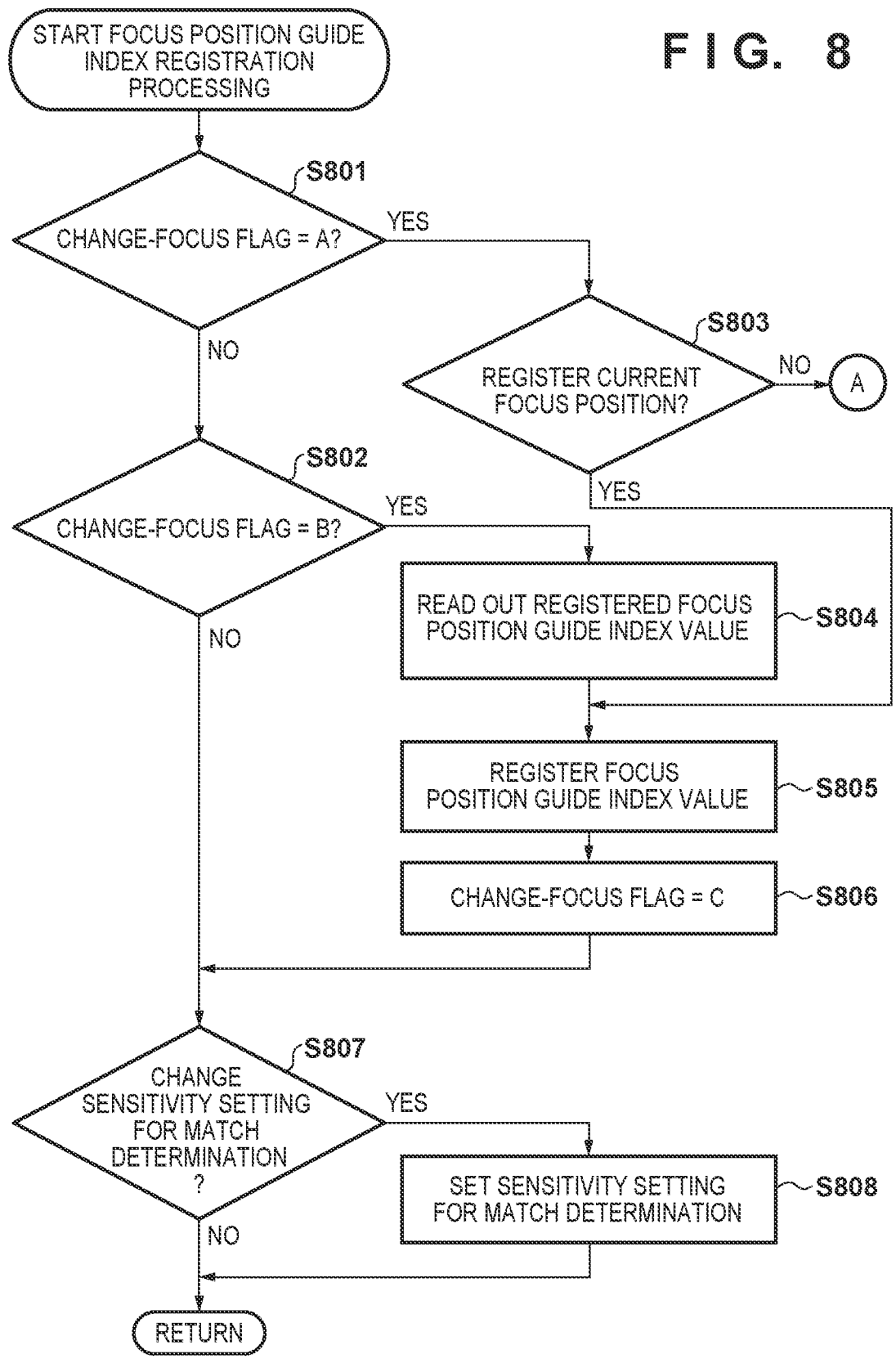
FIG. 8 is a flowchart illustrating focus position guide index registration processing according to the first and third embodiments.

Next, the focus position guide index registration processing performed in step S210 of FIG. 2 will be described with reference to the flowchart of FIG. 8.

First, in step S801, it is determined whether or not the change-focus flag is A. If it is determined to be A, the process proceeds to step S803, and if it is determined to be not A, the process proceeds to step S802.

In step S802, it is determined whether or not the change-focus flag is B. If it is determined to be B, the process proceeds to step S804, and if it is determined to be not B, i.e., it is determined to be C, the process proceeds to step S807.

In step S803, since the change-focus flag is A, that is, the past focus position guide index value associated with the lens ID does not remain, or even if it remains, its accuracy is not sufficient, so it is determined whether or not to register the current focus position guide index value registration decision button position as a focus position guide index value for the focus position guide function being executed. In this embodiment, it is determined whether or not the user has pressed the focus position guide index value registration decision button included in the camera operation unit 121 of FIG. 1 (whether or not a registration instruction is issued). If it is determined to register, the process advances to step S805, and if it is determined not to register, the process returns to step S202 of FIG. 2.

In step S804, since the change-focus flag is B, that is, the past focus position guide index value associated with the lens ID remains and the accuracy is sufficient, the focus position guide index value of the same ID that is registered in the past is read out, and the process proceeds to step S805.

In step S805, the focus position guide index value is registered, and the process proceeds to step S806.

In the present embodiment, it is assumed that three focus position guide index values can be registered for one lens ID, and a method of setting by dividing the distance between Near to Far into 2 to the 16th power will be described. However, the settable number of the focus position guide index values and the number of divisions of the distance from Near to Far are not limited to these, and the settable registration number of the focus position guide index values and the settable registration number of divisions of the distance from Near to Far are not necessarily matched to the settable numbers.

In step S805, if the current focus position is determined to be registered in step S803, the current focus position is registered as the focus position guide index value. In this embodiment, the position information of the focus lens actuated in step S604 of FIG. 6 is used as the current focus position, and is registered as a focus position guide index value in the recording unit 119 in association with the lens ID acquired in step S703. Further, in a case where the focus position guide index value of the same lens ID registered in the past is read out in step S804, the read index value is registered as the focus position guide index value.

In addition, upon registering a new focus position guide index value, a configuration may be provided that allows the user to select whether or not to keep the currently registered focus position guide index value. Alternatively, the current index value may be automatically updated to a newly registered index value, or the index values may be kept up to a predetermined number, and the oldest index value may be replaced by a new index value if the number of registered index values has reached its upper limit.

Figure 10:
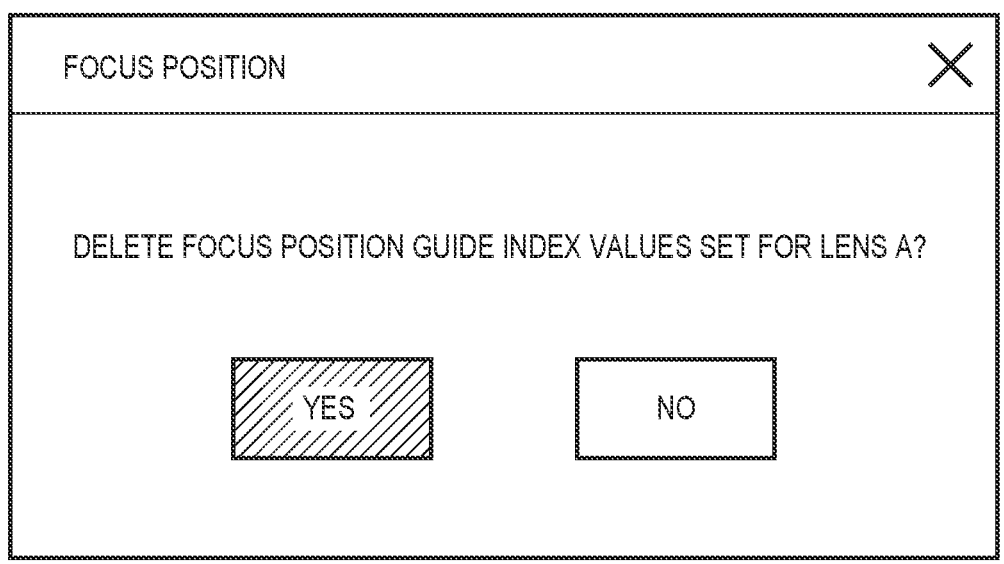
FIG. 10 is a diagram illustrating an example of a displayed warning message regarding a focus position guide according to the first embodiment.

Furthermore, it is also possible to automatically delete the registered focus position guide index value. A condition for automatically updating the current index value to a newly registered index value includes a case where it is determined that the accuracy of the focus position guide index value registered in the past in association with the corresponding lens ID in step S704 is insufficient, a case where a predetermined time has passed since a lens having the same ID was attached last time, and so forth. In such cases, a warning message such as that shown in FIG. 10 may be displayed so as to worn the user, and the focus position guide index value/values stored in the recording unit 119 may be deleted for each lens ID.

After registering the focus position guide index value, the change-focus flag is changed to C in step S806, and the process proceeds to step S807.

In step S807, a selection is made as to whether or not to change the sensitivity setting regarding the match determination between the registered focus position guide index value and the current focus position. In this embodiment, the user selects whether or not to change the sensitivity setting via the camera operation unit 121 in FIG. 1, and if the sensitivity setting is to be changed, the process proceeds to step S808, and if not, the processing ends.

In step S808, the sensitivity setting used for determining whether the registered focus position guide index value and the current focus position match is set. In this embodiment, the sensitivity can be set in 5 degrees, and the range for determining that the registered focus position guide index value and the current focus position match can be set for each sensitivity, so that the desired focusing accuracy can be set. In this embodiment, it is possible to set the range to be determined that the current focus position and the focus position guide index value match with a ratio corresponding to the number of divisions of the distance from Near to Far with the focus position guide index value set in step S805 as the center.

Figure 9:
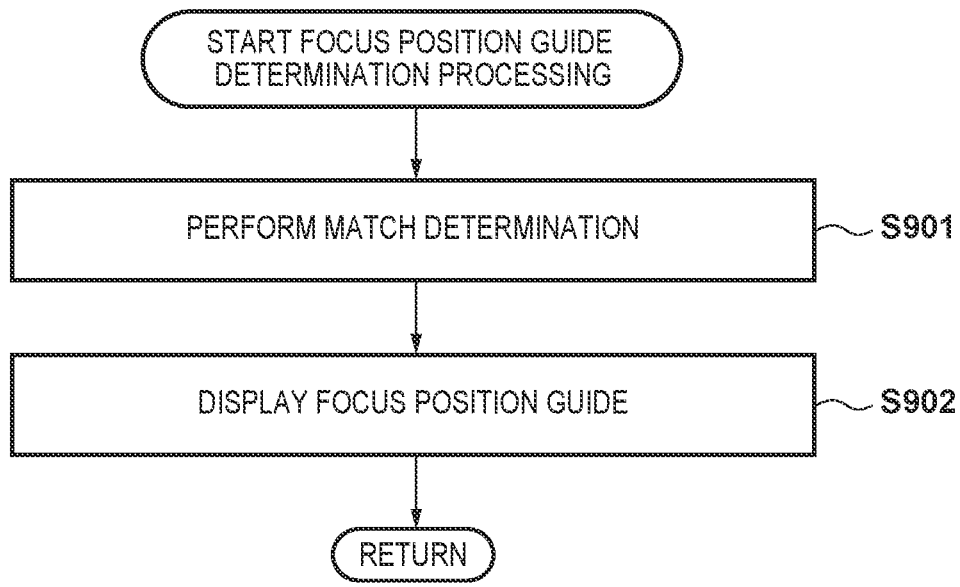
FIG. 9 is a flowchart illustrating focus position determination processing according to the embodiment.

Next, the focus position guide determination processing performed in S211 of FIG. 2 will be described with reference to the flowchart of FIG. 9.

Figure 11:
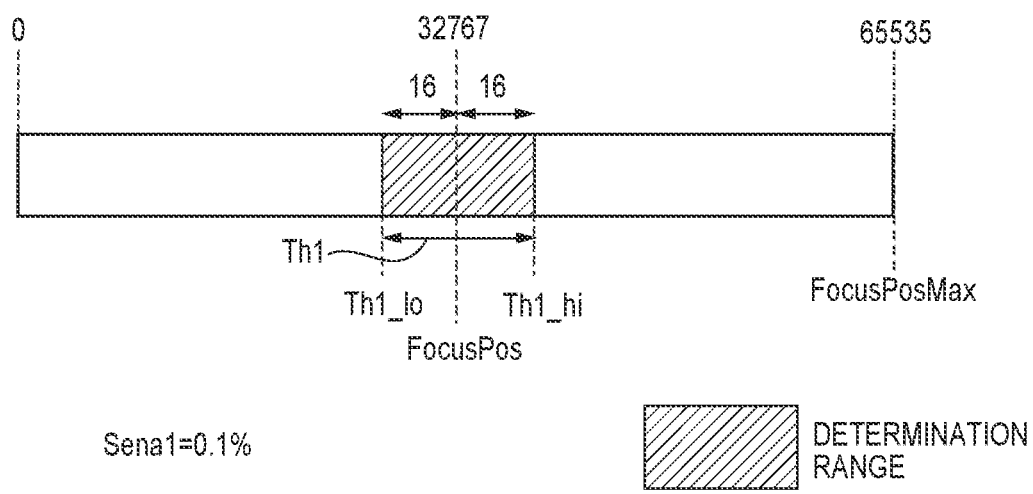
FIG. 11 is a diagram for explaining an in-focus range of a focus position according to the embodiment.

In step S901, match determination is performed using the sensitivity set in step S808, the focus position guide index value set in step S805, and the actuation position information of the focus lens acquired in step S604. Let FocusPosMax be the division number of the focus position guide, Sens1 be the sensitivity setting, Th1 be the focus position guide range in which match is determined, and Sens1=0.1%, the match determination range Th1 can be expressed by Equation (1). Further, let FocusPos1 be the focus position guide index value, Th1_lo be the lower limit of the focus position guide range within which match is determined, and Th1_hi be the upper limit of the focus position guide range within which match is determined, Th1_lo and Th1_hi can be expressed by Equations (2) and (3), respectively. FIG. 11 shows a range within which match is determined if FocusPosMax is 65535, FocusPos1 is 32767, and Sens1 is 0.1%.

$$Th1 = FocusPosMax \times Sens1 \qquad (1)$$

$$Th1\_lo = FocusPos1 - (Th1)/2 \qquad (2)$$

$$Th1\_hi = FocusPos1 + (Th1)/2 \qquad (3)$$

In step S902, the focus position guide is displayed on the display unit 118 based on the match determination result determined in step S901, the focus position guide index value, and the focus actuation position information. If it is determined that they match, for example, the periphery of the screen is enhanced to indicate to the user that they match, and if they do not match, no enhanced is performed.

Figure 12:
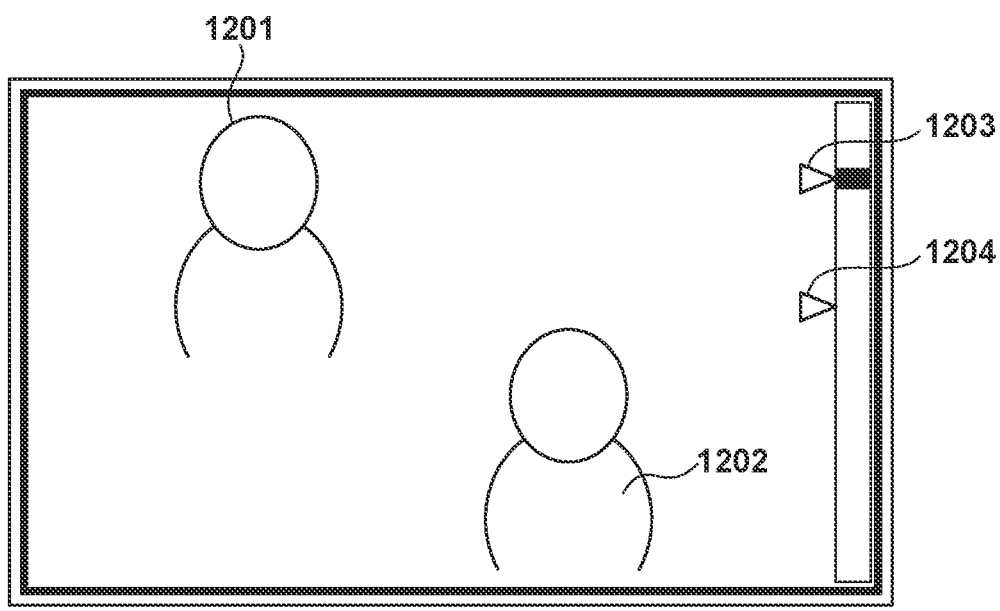
FIG. 12 is a diagram illustrating an example of focus position determination result according to the embodiment.

FIG. 12 shows an example of displayed content in a case where match is determined. Triangular icons 1203 and 1204 shown in FIG. 12 are focus position guide index values set by the user, and the focus positions corresponding to the icons are positions at which the person 1201 and person 1202 are in focus, respectively. In this case, the enhanced display is shown when the user operates the focus lens to the position at which the person 1201 is in focus. In the example shown in FIG. 12, a bar indicating the focus position is displayed at the right end of the screen, however, the location and the way to display the focus position are not limited to this. In addition, different threshold values of the match determination range may be used in a case where the focus position guide index value and the focus position is approaching and in a case where the focus position guide index and the focus position is separating, and other methods may be used for setting the match determination conditions.

As described above, according to the first embodiment, when the focus is manually adjusted, even if the shooting lens is exchanged, the focus position guide index value is appropriately maintained or deleted to assist preparation before shooting, thereby shortening the time required for preparation for shooting.

In this embodiment, the focus position guide is displayed only in the case of MF, but it may also be displayed in the case of AF. In the latter case, the user can check the difference between the focus position set in the past and the current focus position by AF. In the case of AF, in step S901 of FIG. 9, the actuation position information of the focus lens obtained in step S404 may be used.

Second Embodiment

Next, a second embodiment of the present invention will be described.

In the first embodiment, an example of setting and deleting the focus position based on the lens identification information has been described. In the second embodiment, a case of changing the focus position guide index value in a case where the lens identification information cannot be acquired will be explained. Note that the configuration of the image capturing apparatus and processes other than this are the same as those of the first embodiment, so description thereof will be omitted.

Figure 13:
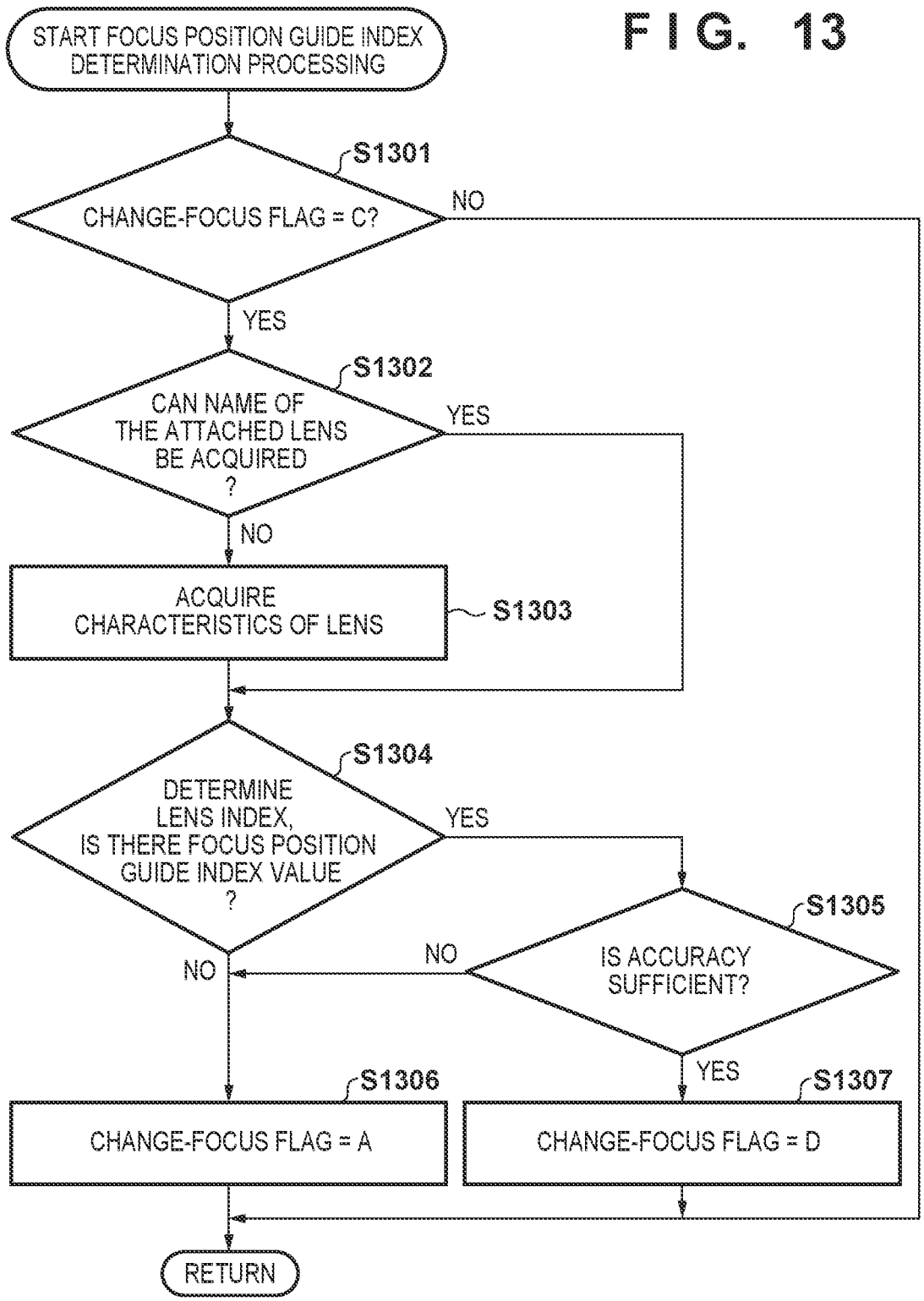
FIG. 13 is a flowchart illustrating focus position guide index determination processing according to a second embodiment.
Figure 14:
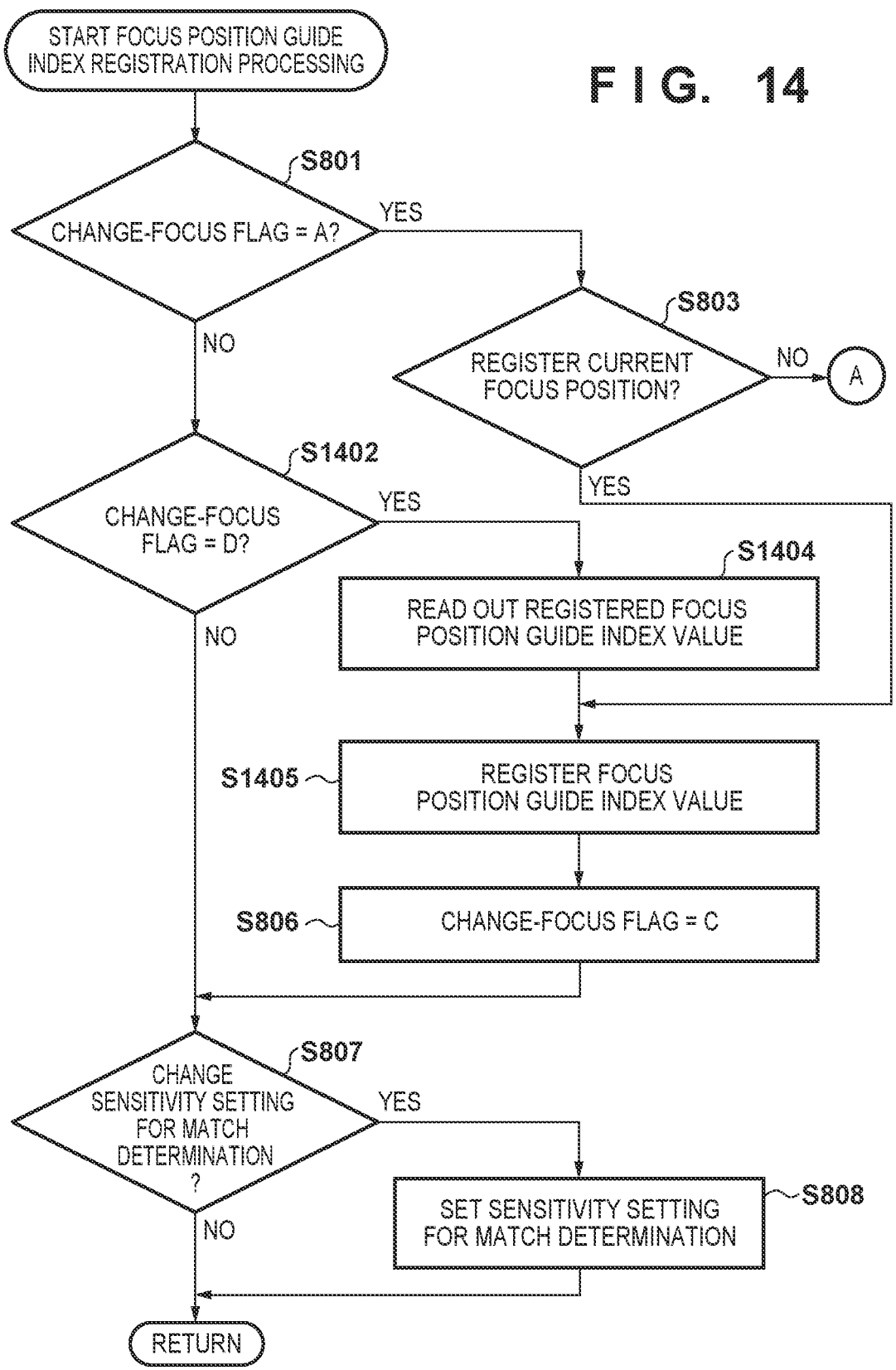
FIG. 14 is a flowchart illustrating focus position guide index registration processing according to the second embodiment.

The focus position guide index determination processing performed in step S209 of FIG. 2 and the focus position guide index registration processing performed in step S210 of FIG. 2 in the second embodiment will be described below with reference to the flowcharts of FIGS. 13 and 14, respectively. These processings are performed in place of the processings described with reference to FIGS. 7 and 8.

First, the focus position guide index determination processing in step S209 of FIG. 2 will be described with reference to the flowchart of FIG. 13.

In step S1301, it is determined whether or not the change-focus flag is set to C. If it is determined to be C, the process advances to step S1302, and if it is determined to be not C, the processing ends.

In step S1302, it is determined whether or not the name of the attached lens can be acquired. If the name of the lens can be acquired, a lens index is created in association with the name of the lens, then the process proceeds to step S1304, and if the name of the lens cannot be acquired, the process proceeds to step S1303.

In step S1303, data representing the characteristics of the lens are acquired. Examples of data representing characteristics include focal length information, shortest shooting distance information, full-open aperture value information, control motor information, generation information, built-in extender information, image stabilization information, AFMF information, and so on. A unique lens index is created from the information so that the lens can be identified, and the process proceeds to step S1304.

In step S1304, it is determined whether or not the past focus position guide index value corresponding to the lens name acquired in step S1302 or the lens index created in step S1303 exists. If the past focus position guide index value exists, the process proceeds to step S1305, and if the past focus position guide index value does not exist, the process proceeds to step S1306.

In step S1305, it is determined whether or not the accuracy of the past focus position guide index value associated with the lens name acquired in step S1302 or the lens index created in step S1303 is sufficient under the current shooting settings, and it is also determined whether or not the accuracy of the current focus position guide index value will be sufficient if shooting settings will be changed. The shooting settings are the same as those described in step S703 of FIG. 7 in the first embodiment. If the accuracy of the focus position guide index value is determined to be insufficient, the process proceeds to step S1306, and if the accuracy is determined to be sufficient, the process proceeds to step S1307.

In step S1306, the change-focus flag is set to A, and in step S1307, the change-focus flag is set to D, and the processing ends.

Next, the focus position guide index registration processing performed in step S210 of FIG. 2 will be described with reference to the flowchart of FIG. 14. It should be noted that the same step numbers are assigned to the same processes as in the processes shown in FIG. 8, and descriptions thereof are omitted.

If it is determined that the change-focus flag is A in step S801, it is determined whether the change-focus flag is D in step S1402. If it is determined to be D, the process advances to step S1404, and if it is determined to be not D, the process advances to step S807.

In step S1404, since the change-focus flag is D, that is, the past focus position guide index value associated with the lens name or lens index exists and its accuracy is sufficient, the focus position guide index value of the same lens name or the lens index registered in the past is read out, and the process advances to step S1405.

In step S1405, the focus position guide index value is registered, and the process proceeds to step S806. The settable number of focus position guide index values, the number of divisions of the range from Near to Far, and the setting method are similar to those described in step S805 in FIG. 8, so the description thereof is omitted, however, upon storing the focus position guide index value in the recording unit 119, it is associated with a lens name or lens index.

Figure 15:
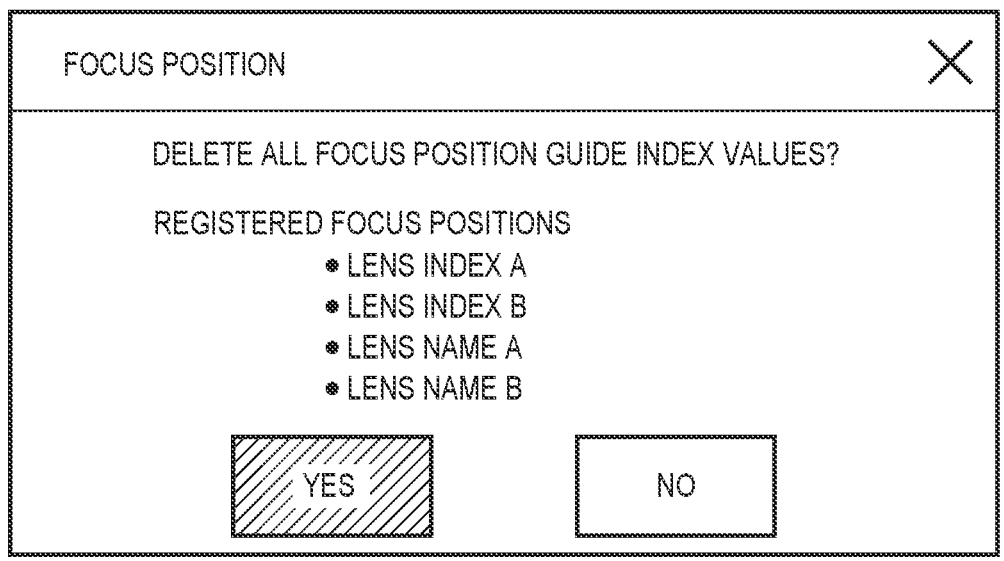
FIG. 15 is a diagram illustrating an example of a displayed warning message regarding a focus position guide according to the second embodiment.

Furthermore, the user can operate to delete a specific focus position setting value registered in the past or to delete all registered focus position guide index values at once. In this case, the camera operation unit 121 is operated, the focus position guide index value or values stored in the recording unit 119 are selected for each lens name or lens index, and deleted collectively or for each focus position. In that case, a warning message such as that shown in FIG. 15 is displayed to warn the user.

As described above, according to the second embodiment, even when the identification information of the shooting lens cannot be obtained when performing manual focus adjustment, it is possible to appropriately maintain or delete the focus position guide index value, and it is possible to shorten the time required for preparation for shooting.

Third Embodiment

Next, a third embodiment of the present invention will be described.

In the first and second embodiments, a case has been described in which it is determined whether or not to set and change the focus position guide index value according to the result of identifying the lens. On the other hand, in the third embodiment, a case will be described in which whether or not to set or change the focus position guide index value is selected regardless of the identification of the lens. Note that the configuration of the image capturing apparatus and other processes are the same as those of the first embodiment, so description thereof will be omitted.

Figure 16:
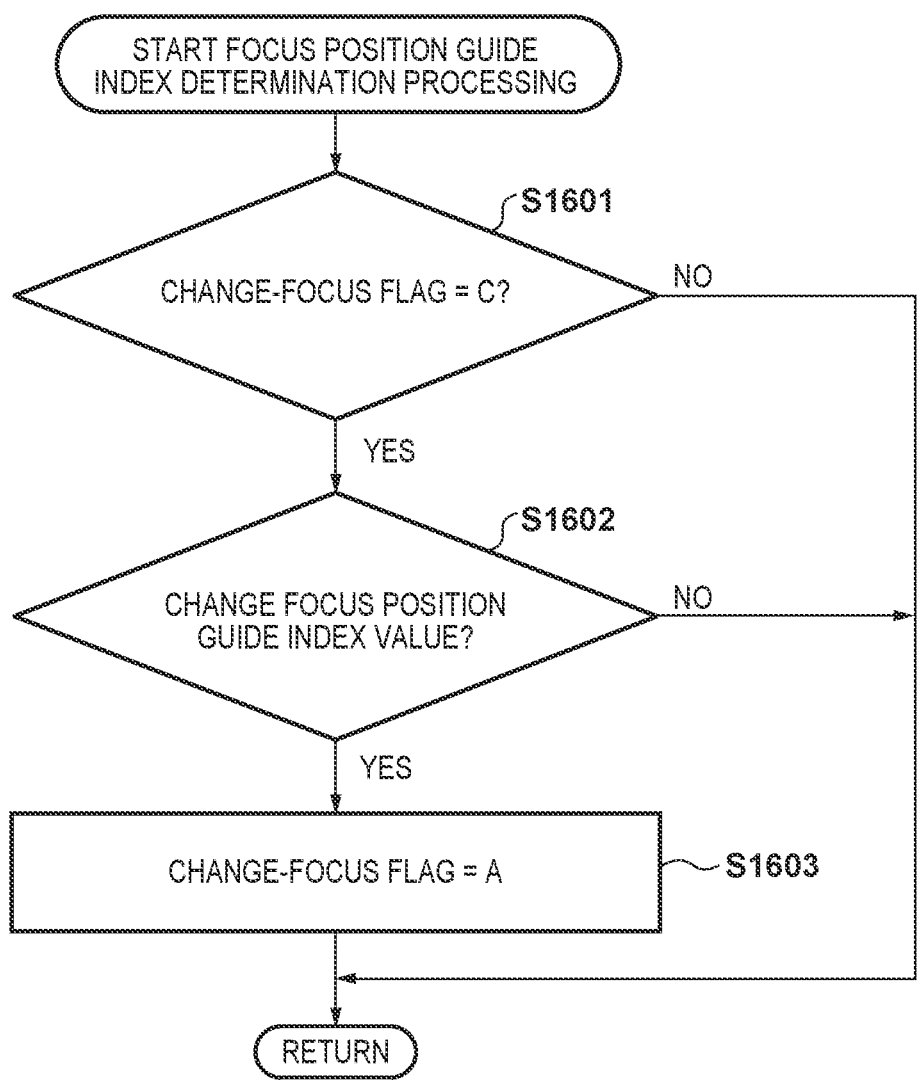
FIG. 16 is a flowchart illustrating focus position guide index determination processing according to the third embodiment.

The focus position guide index determination processing performed in step S209 of FIG. 2 will be described below with reference to the flowchart of FIG. 16. Note that the processing shown in FIG. 16 is performed in place of the processing described with reference to FIG. 7.

In step S1601, it is determined whether or not the change-focus flag is set to C. If it is determined to be C, the process advances to step S1602, and if it is determined to be not C, the processing ends.

In step S1602, it is determined whether or not to change the focus position guide index value. In this embodiment, the user selects whether or not to change the focus position guide index value via the camera operation unit 121 in FIG. 1, and if it is determined to change, the process advances to step S1603, and if it is determined not to change, the processing ends.

In step S1603, the change-focus flag is set to A, and the processing ends.

Thus, according to the present invention, if the manual focus adjustment mode is provided, it is possible to appropriately change the focus position guide index value without depending on the lens discrimination, and it is possible to shorten the time required for preparation for shooting.

Note that the method of setting the focus position guide index value is not limited to the method described above, and can be set by any of various methods. In addition, the MF operation can be performed by various methods, and the operation of deleting the set focus position guide index value can also be performed by any of various methods.

Other Embodiments

It should be noted that the present invention may be applied to a system composed of a plurality of devices or to an apparatus composed of a single device.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-122017, filed Jul. 29, 2022, which is hereby incorporated by reference herein in its entirety.

What is claimed is:
1. An image capturing apparatus comprising:
an operation member used to move a position of focus lens included in an attached optical system;
a recording unit that records the position of the focus lens as an index value in a memory in association with information of the attached optical system including the focus lens in response to a registration instruction;
an acquisition unit that acquires information for identifying the attached optical system;
a readout unit that, if there is an index value recorded in association with the information of the attached optical system corresponding to the information acquired by the acquisition unit, reads out the index value from the memory;
a control unit that controls a display device to display the read index value and a current position of the focus lens; and
a determination unit that determines accuracy of the index value recorded in association with the information of the attached optical system,
wherein the control unit controls not to display the read index value on the display device in a case where the accuracy determined by the determination unit is lower than a predetermined accuracy, and
wherein the recording unit, the acquisition unit, the readout unit, the control unit, and the determination unit are implemented by one or more processors and/or circuitry.

2. The image capturing apparatus according to claim 1, wherein the recording unit further records a shooting setting related to shooting that is set at a time of storing the index value in association with the information of the optical system,
wherein the determination unit determines the accuracy of the read index value based on a difference between a current shooting setting and the recorded shooting setting.

3. The image capturing apparatus according to claim 2, wherein the shooting setting includes at least one of imaging area, angle of view, resolution, optical path length of lens, focal length, whether or not distortion correction is performed, whether or not peripheral light amount correction is performed, whether or not resolution enhancement is performed, and whether or not image stabilization is performed.

4. The image capturing apparatus according to claim 1, wherein the recording unit further records time when the optical system was attached in association with the information of the optical system, and
wherein the determination unit determines the accuracy based on the time elapsed since the attached optical system was last attached.

5. The image capturing apparatus according to claim 1 further comprising a deletion unit that deletes the index value stored in association with the information of the attached optical system when the accuracy determined by the determination unit is lower than a predetermined accuracy,
wherein the deletion unit is implemented by one or more processors and/or circuitry.

6. The image capturing apparatus according to claim 5, wherein the deletion unit deletes all the index value or values stored in association with the information of the attached optical system.

7. The image capturing apparatus according to claim 1, wherein, in a case where the accuracy determined by the determination unit is lower than a predetermined accuracy, the control unit controls to display on the display device options to be used by a user to instruct whether or not to delete the index value stored in association with the information of the attached optical system,
the image capturing apparatus further comprises a deletion unit that deletes the index value in a case where deletion is instructed,
wherein the deletion unit is implemented by one or more processors and/or circuitry.

8. The image capturing apparatus according to claim 7, wherein the deletion unit deletes all the index value or values recorded in association with the information of the attached optical system.

9. An image capturing apparatus comprising:
an operation member used to move a position of focus lens included in an attached optical system;
a recording unit that records the position of the focus lens as an index value in a memory in association with information of the attached optical system including the focus lens in response to a registration instruction;
an acquisition unit that acquires information for identifying the attached optical system;
a readout unit that, if there is an index value recorded in association with the information of the attached optical system corresponding to the information acquired by the acquisition unit, reads out the index value from the memory; and
a control unit that controls a display device to display the read index value and a current position of the focus lens,
wherein, in a case where a predetermined number of index values associated with the information of the attached optical system are recorded in the memory by the recording unit, in response to an instruction to register another position of the focus lens, an oldest one of the recorded index values is deleted, and the other position is recorded as an index value, and
wherein the recording unit, the acquisition unit, the readout unit, and the control unit are implemented by one or more processors and/or circuitry.

10. An image capturing apparatus comprising:
an operation member used to move a position of focus lens included in an attached optical system;
a recording unit that records the position of the focus lens as an index value in a memory in association with information of the attached optical system including the focus lens in response to a registration instruction;
an acquisition unit that acquires information for identifying the attached optical system;
a readout unit that, if there is an index value recorded in association with the information of the attached optical system corresponding to the information acquired by the acquisition unit, reads out the index value from the memory;
a control unit that controls a display device to display the read index value and a current position of the focus lens, wherein the control unit controls to display on the display device options to be used by a user to instruct whether or not to delete any of the index values recoded in the memory by the recording unit; and
a deletion unit that, in a case where deletion of any of the index values is instructed, deletes the index value,
wherein the recording unit, the acquisition unit, the readout unit, the control unit, and the deletion unit are implemented by one or more processors and/or circuitry.

11. The image capturing apparatus according to claim 10, wherein the information for identifying the attached optical system is ID information, lens name, or data representing characteristics of lens.

12. An assisting method for focus control comprising:
repeatedly obtains a position of focus lens included in an attached optical system;
recording the position of the focus lens as an index value in a memory in association with information of the attached optical system including the focus lens in response to a registration instruction;
acquiring information for identifying the attached optical system;
if there is an index value recorded in association with the information of the attached optical system corresponding to the acquired information reading out the index value from the memory;
controlling a display device to display the read index value and a current position of the focus lens, wherein the display device is controlled to display options to be used by a user to instruct whether or not to delete any of the index values recoded in the memory; and
in a case where deletion of any of the index values is instructed, deleting the index value.

13. A non-transitory computer-readable storage medium, the storage medium storing a program that is executable by the computer, wherein the program includes program code for causing the computer to function as an image capturing apparatus having an operation member used to move a position of focus lens included in an attached optical system, comprising:
a recording unit that records the position of the focus lens as an index value in a memory in association with information of the attached optical system including the focus lens in response to a registration instruction;
an acquisition unit that acquires information for identifying the attached optical system;
a readout unit that, if there is an index value recorded in association with the information of the attached optical system corresponding to the information acquired by the acquisition unit, reads out the index value from the memory;
a control unit that controls a display device to display the read index value and a current position of the focus lens, wherein the control unit controls to display on the display device options to be used by a user to instruct whether or not to delete any of the index values recoded in the memory by the recording unit; and
a deletion unit that, in a case where deletion of any of the index values is instructed, deletes the index value.

14. An image capturing apparatus according to claim 1 further comprising:
an operation member used to move a position of focus lens included in an attached optical system;
a recording unit that records the position of the focus lens as an index value in a memory in association with information of the attached optical system including the focus lens in response to a registration instruction;
an acquisition unit that acquires information for identifying the attached optical system;
a readout unit that, if there is an index value recorded in association with the information of the attached optical system corresponding to the information acquired by the acquisition unit, reads out the index value from the memory;
a control unit that controls a display device to display the read index value and a current position of the focus lens; and
a match determination unit that determines whether or not a position of any of the read index values and a current position of the focus lens match, wherein, in a case where match is determined by the match determination unit, the control unit controls the display device to display that the position of any of the read index values and the current position of the focus lens match, and
wherein the recording unit, the acquisition unit, the readout unit, the control unit, and the match determination unit are implemented by one or more processors and/or circuitry.

15. The image capturing apparatus according to claim 14 further comprising a setting unit that sets sensitivity for determining the match,
wherein the setting unit is implemented by one or more processors and/or circuitry.

16. The image capturing apparatus according to claim 15, wherein the setting unit sets the sensitivity based on depth of field.

17. The image capturing apparatus according to claim 14, wherein the information for identifying the attached optical system is ID information, lens name, or data representing characteristics of lens.

18. An assisting method for focus control comprising:
repeatedly obtains a position of focus lens included in an attached optical system;
recording the position of the focus lens as an index value in a memory in association with information of the attached optical system including the focus lens in response to a registration instruction;
acquiring information for identifying the attached optical system;
if there is an index value recorded in association with the information of the attached optical system corresponding to the acquired information reading out the index value from the memory;
controlling a display device to display the read index value and a current position of the focus lens; and
determining whether or not a position of any of the read index values and a current position of the focus lens match,
wherein, in a case where match is determined, the display device is controlled to display that the position of any of the read index values and the current position of the focus lens match.

19. A non-transitory computer-readable storage medium, the storage medium storing a program that is executable by the computer, wherein the program includes program code for causing the computer to function as an image capturing apparatus having an operation member used to move a position of focus lens included in an attached optical system, comprising:
a recording unit that records the position of the focus lens as an index value in a memory in association with information of the attached optical system including the focus lens in response to a registration instruction;
an acquisition unit that acquires information for identifying the attached optical system;
a readout unit that, if there is an index value recorded in association with the information of the attached optical system corresponding to the information acquired by the acquisition unit, reads out the index value from the memory;
a control unit that controls a display device to display the read index value and a current position of the focus lens; and
a match determination unit that determines whether or not a position of any of the read index values and a current position of the focus lens match, wherein, in a case where match is determined by the match determination unit, the control unit controls the display device to display that the position of any of the read index values and the current position of the focus lens match.

* * * * *